United States Patent [19]
Imamura et al.

[11] Patent Number: 6,016,128
[45] Date of Patent: Jan. 18, 2000

[54] GPS WAVE ANTENNA APPARATUS

[75] Inventors: Yutaka Imamura, Yokohama; Tatsuaki Taniguchi; Kazuo Shigeta, both of Hiroshima-ken, all of Japan

[73] Assignee: Harada Industry Co., Ltd., Tokyo, Japan

[21] Appl. No.: 09/145,590

[22] Filed: Sep. 2, 1998

[30] Foreign Application Priority Data

Sep. 4, 1997 [JP] Japan .................................. 9-239641

[51] Int. Cl.⁷ ........................... H01Q 11/12; H01Q 7/00; H01Q 1/42
[52] U.S. Cl. ......................... 343/741; 343/866; 343/872; 343/728
[58] Field of Search ................................... 343/728, 872, 343/702, 700 MS, 741, 866, 795

[56] References Cited

U.S. PATENT DOCUMENTS 4,717,921  1/1988  Ohe et al. ................................ 343/741
5,300,936  4/1994  Izadian .............................. 343/700 MS Primary Examiner—Hoanganh Le
Assistant Examiner—Jennifer H. Malos
Attorney, Agent, or Firm—Volpe and Koenig, P.C.

[57] ABSTRACT

A GPS wave antenna apparatus according to the present invention includes a substrate unit having a printed board on which an antenna constituting element including a GPS wave antenna element is mounted integrally as one component, a case having an opening portion at one end, for detachably receiving the substrate unit through the opening portion, and a conductive plate attached to the case so as to block the opening portion and arranged opposite to the GPS wave antenna element at a fixed distance therebetween. The GPS wave antenna element has a thin-film conductive pattern, and the substrate unit includes a low noise amplifier provided on the printed board and a feeder connected to a feeder section of the antenna element through the low noise amplifier.

5 Claims, 3 Drawing Sheets

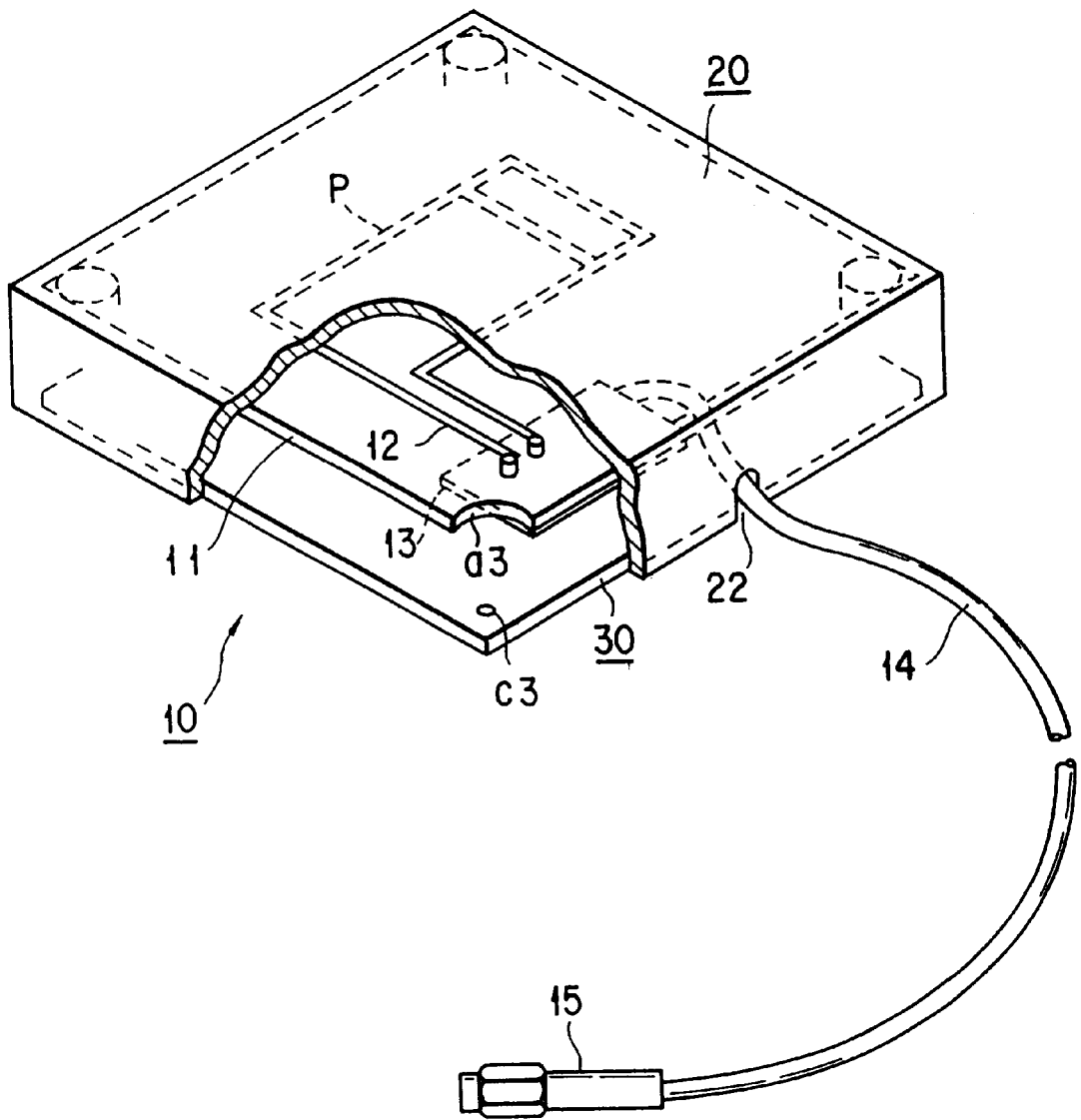
F I G. 1

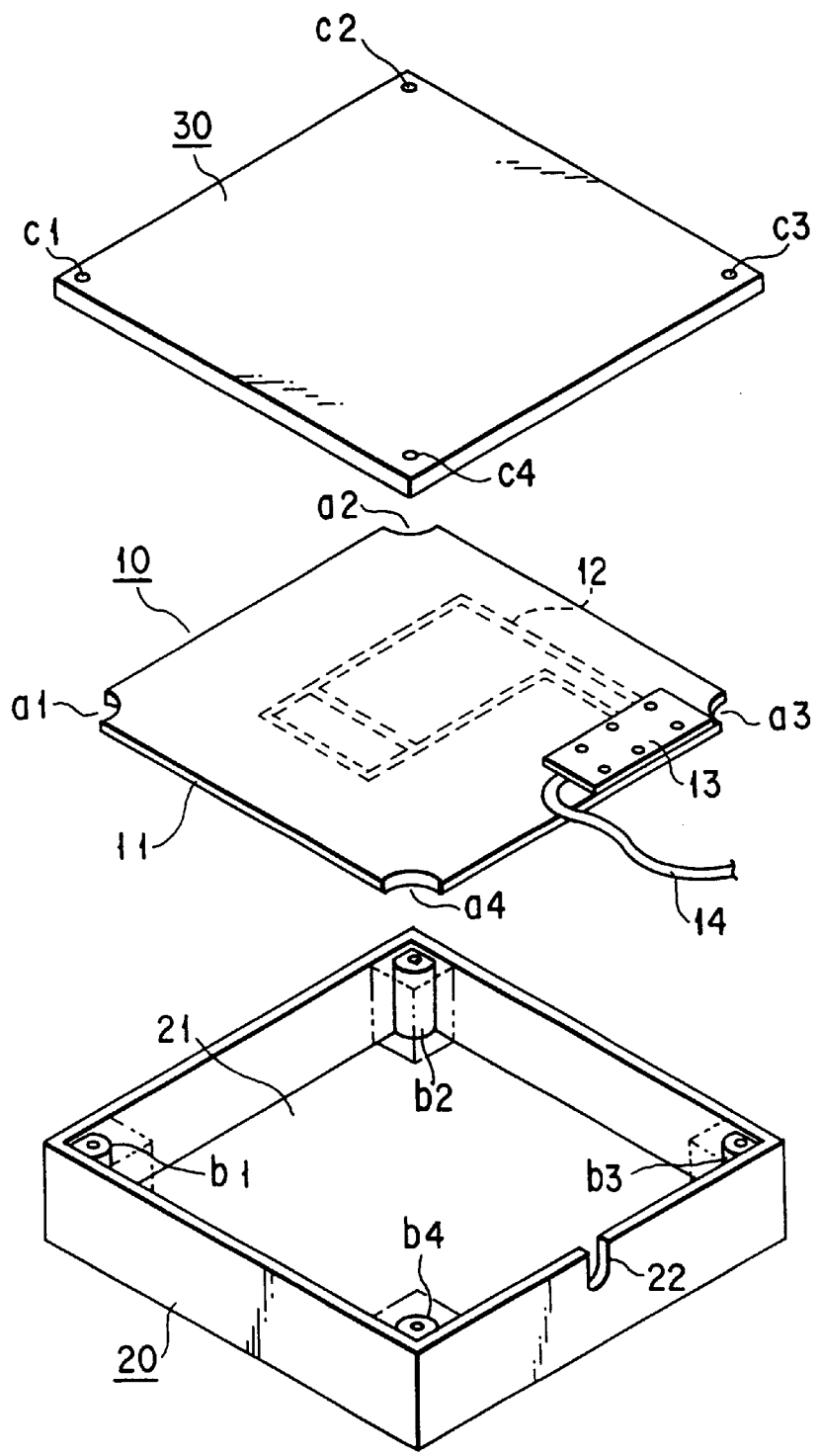
F I G. 2

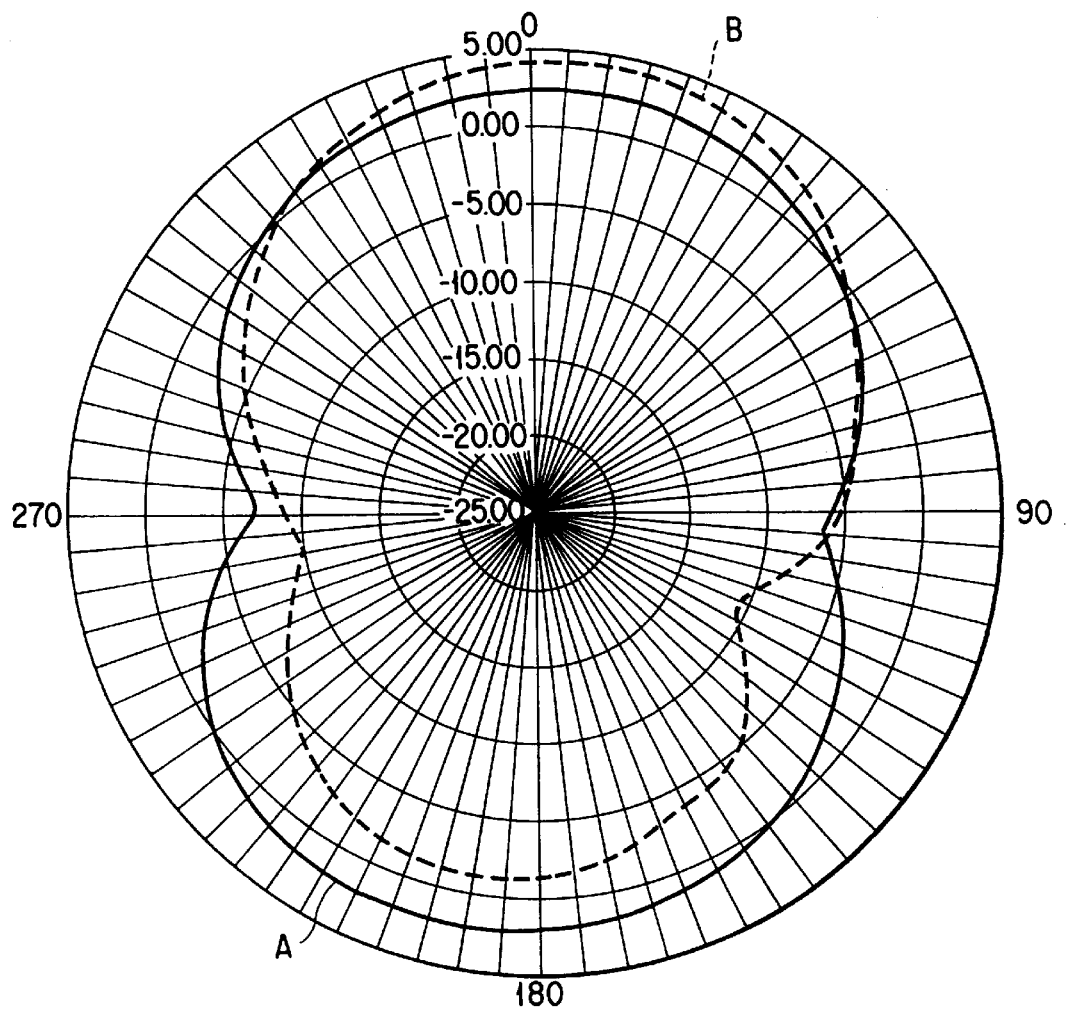
F I G. 3

GPS WAVE ANTENNA APPARATUS

BACKGROUND OF THE INVENTION

The present invention relates to a GPS (Global Positioning System) wave antenna apparatus mounted on part of an automobile and the like.

In a conventionally-known GPS wave antenna apparatus, an antenna element of thin-plate conductor is formed on the surface of a dielectric block made of ceramics and the like as a patch antenna, and this patch antenna is placed on the surface of a printed circuit board. In most cases, an LNA (Low Noise Amplifier) including a transistor, a resistor and a capacitor is mounted on the back of the printed circuit board. For the above antenna using a dielectric, a ground plate is generally formed on the back of the antenna.

The GPS wave antenna apparatus having the above constitution causes the following problem. Since the printed circuit board is bonded to the patch antenna having a considerably great thickness, the total thickness of the antenna apparatus is increased. Since, furthermore, the ground plate is mounted on the back of the patch antenna, the thickness of the antenna apparatus is increased greater or greater. Since the antenna apparatus has a three-layered structure of the patch antenna, printed circuit board and ground plate, its structure is considerably complicated, its manufacture is difficult, and its manufacturing cost is high.

BRIEF SUMMARY OF THE INVENTION

An object of the present invention is to provide a GPS wave antenna apparatus which is not only capable of receiving a GPS wave satisfactorily, but also simple in constitution, low in manufacturing costs, and easy to maintain and control.

To attain the above object, the GPS wave antenna apparatus of the present invention has the following constitution. The characteristic constitution other than the above will be clarified in the embodiment of the present invention.

According to an aspect of the present invention, there is provided a GPS wave antenna apparatus comprising a substrate unit having a printed board on which an antenna constituting element including a GPS wave antenna element is mounted integrally as one component, a case having an opening portion at one end, for detachably receiving the substrate unit through the opening portion, and a conductive plate attached to the case so as to block the opening portion and arranged opposite to the GPS wave antenna element at a fixed distance therebetween.

In the GPS wave antenna apparatus having the above constitution, an antenna constituting element including a GPS wave antenna element having a thin-film conductive pattern is formed on a single printed board integrally with each other as one component to be constituted as a substrate unit. The antenna apparatus is therefore capable of receiving a GPS wave satisfactorily and made compact greatly. The antenna apparatus has a two-layered structure of a substrate unit and a conductive plate; however, since the conductive plate is used as a lid for blocking an opening portion of a case, the antenna apparatus is substantially constituted of a single layer. Consequently, the apparatus is easy in constitution and low in manufacturing costs. Since, moreover, the apparatus is easy to assemble and disassemble, its maintenance and control can be performed very satisfactorily.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIG. 1 is a cutaway, perspective view of the constitution of a GPS wave antenna apparatus according to an embodiment of the present invention;

FIG. 3 is a view of a vertical plane radiation pattern showing experimental results of directivity of the GPS wave antenna apparatus according to the embodiment of the present invention.

DETAILED DESCRIPTION OF THE INVENTION (Embodiment)

Figure 2:
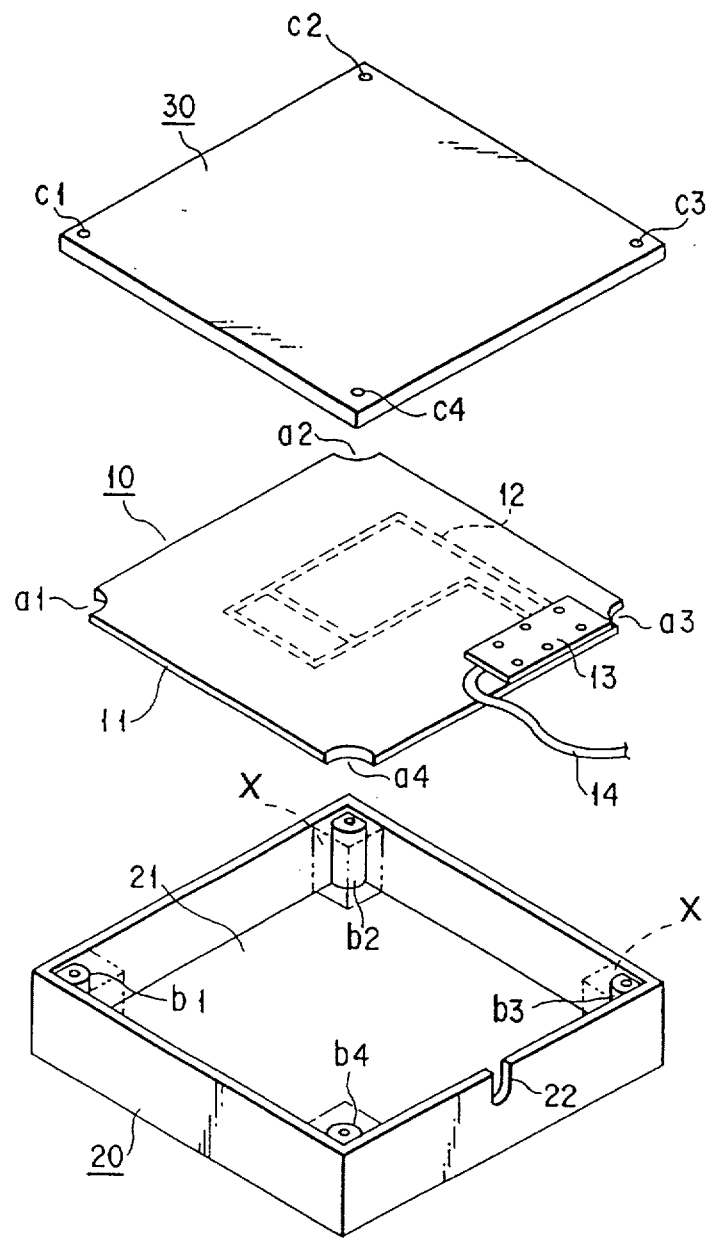
FIG. 2 is an exploded, perspective view depicting the GPS wave antenna apparatus of FIG. 1 top side down.

In FIGS. 1 and 2, reference numeral 10 indicates a substrate unit, numeral 20 shows a case, and numeral 30 denotes a conductive plate.

The substrate unit 10 has a printed board 11 on which an antenna constituting element including a GPS wave antenna element 12 is mounted integrally as one component. More specifically, the antenna element 12 has a thin-film conductive pattern P and is formed on the surface of the printed board 11, and the substrate unit 10 includes a low noise amplifier 13 provided near a corner portion of the back of the printed board 11, and a feeder 14 constituted of a coaxial cable one end of which is connected to a feeder section of the antenna element 12 through the low noise amplifier 13.

One end of the low noise amplifier 13 is electrically connected to the feeder section of the antenna element 12, and the other end thereof is electrically connected to a conductive portion of the feeder 14. A connector 15 is attached to the tip of the feeder 14.

The thin-film conductive pattern P of the antenna element 12 is formed of a compound line including thin, narrow conductive lines (e.g., copper-made strip conductive lines) arranged in parallel and an almost rectangular conductive loop including a short side of the compound line, thereby constituting a right-hand circular polarization antenna element. The antenna element 12 is so formed that it radiates circularly polarized wave in a direction perpendicular to the plane on which the rectangular loop is formed.

Arc-shaped cutaway portions a1, a2, a3 and a4, which are to be guided and fitted to the mounting columns of the case 20 (described later), are provided at four corners of the printed board.

The case 20 is integrally molded by ABS resin so as to be shaped like a box, and its one end serves as an opening portion 21 capable of detachably receiving the substrate unit 10. A feeder lead-through hole 22 is provided at part of the wall of the case 20, and the mounting columns b1, b2, b3 and b4 are provided at four corners of the inner surface of the case 20. The outer surfaces of these mounting columns b1 to b4 serve to guide the arc-shaped cutaway portions a1 to a4 formed at the four corners of the printed board.

The conductive plate 30 is constituted of a rectangular aluminum plate having a thickness of about 2 mm and has screw insertion holes c1, c2, c3 and c4 at four corners thereof. These screw insertion holes c1 to c4 correspond to screw holes of the mounting columns b1 to b4. The conductive plate 30 is mounted on the case 20 as a lid for blocking the opening portion 21 of the case 20. Thus, the conductive plate 30 is arranged opposite to the GPS wave antenna element 12 at a fixed distance between them. Since the conductive plate 30 is so arranged, even when the antenna is mounted on an automobile, the influence of diffused reflection due to peripheral metal members can be eliminated, and the antenna characteristics can be prevented from deteriorating.

To fabricate the foregoing antenna apparatus, the substrate unit 10 is inserted into a hollow of the case 20 through the opening portion 21 thereof. Since, in this case, the arc-shaped cutaway portions a1 to a4 at the four corners of the substrate unit 10 are slidably fitted on the outer surfaces of the mounting columns b1 to b4, the unit 10 can be smoothly inserted using the columns b1 to b4 as a guide.

When the substrate unit 10 reaches the innermost portion of the case 20, a spacer is interposed between the unit 10 and each of the columns b1 to b4, as indicated by broken line X, and then the conductive plate 30 is brought into contact with the opening portion 21 of the case 20 as a lid. A screw (not shown) is inserted into the screw hole of each of the columns b1 to b4 through a corresponding one of the screw insertion holes c1 to c4. The antenna apparatus can thus be easily assembled.

Since, furthermore, the antenna apparatus can easily be disassembled by reversing the above procedure, its maintenance is easy to perform.

(Experimental Result)

FIG. 3 is a view of experimental result of directivity of the antenna apparatus according to the embodiment of the present invention, showing a vertical plane radiation pattern which is formed in a direction perpendicular to thin-film conductive pattern P when the substrate unit 10 is arranged horizontally. In FIG. 3, solid curved line A indicates the characteristics of a discrete antenna excluding the conductive plate 30 (substrate unit 10 only), and broken curved line B does the characteristics of the antenna including the conductive plate 30.

As illustrated in FIG. 3, it was confirmed that the directivity of the antenna apparatus was strengthened upward (toward the upper portion of FIG. 3).

(Modifications)

The GPS wave antenna apparatus according to the above embodiment can be modified as follows:

i) A GPS wave antenna element other than the right-hand circular polarization antenna element can be used.

ii) The case 20 can be formed of resin other than ABS resin.

iii) The conductive plate 30 can be formed of brass, iron or the like as well as aluminum.

iv) The feeder section can be detachably connected to the low noise amplifier.

(Features of the Embodiment)

[1] A GPS wave antenna apparatus comprises a substrate unit 10 having a printed board 11 on which an antenna constituting element including a GPS wave antenna element 12 is mounted integrally as one component, a case 20 having an opening portion 21 at one end, for detachably receiving the substrate unit 10 through the opening portion 21, and a conductive plate 30 attached to the case 20 so as to block the opening portion 21 and arranged opposite to the GPS wave antenna element 12 at a fixed distance therebetween.

[2] In the GPS wave antenna apparatus according to the above item [1], the GPS wave antenna element 12 has a thin-film conductive pattern, and the substrate unit 10 includes a low noise amplifier 13 provided on the printed board 11 and a feeder 14 connected to a feeder section of the antenna element 12 through the low noise amplifier 13.

[3] In the GPS wave antenna apparatus according to the above item [1], the GPS wave antenna element 12 includes a loop antenna element.

[4] A GPS wave antenna apparatus comprises a GPS wave loop antenna element 12 having a thin-film conductive pattern formed on a printed board 11, a substrate unit 10 on which a constituting element including the loop antenna element 12 is mounted integrally as one component, a low noise amplifier 13 provided on the printed board 11, and a feeder 14 connected to a feeder section of the loop antenna element 12 through the low noise amplifier 13.

[5] The GPS wave antenna apparatus according to the above item [4] further comprises a conductive plate 30 arranged opposite to the GPS wave loop antenna element 12 at a fixed distance therebetween.

The directivity of the GPS wave antenna apparatus can thus be stabilized.

[6] In the GPS wave antenna apparatus according to the above item [5], the conductive plate 30 is arranged under the loop antenna element 12.

A GPS wave antenna apparatus requires an upward directivity. The apparatus of the present invention can be prevented from being out of directivity due to an object under the apparatus.

[7] In the GPS wave antenna apparatus according to the above item [5], the conductive plate 30 is provided so as to cover an underside of the low noise amplifier.

The conductive plate 30 prevents noise generated from the low noise amplifier 13 from being transmitted downward.

[8] In the GPS wave antenna apparatus according to the above item [4], the loop antenna element 12 is formed on one side of the printed board 11, and the low noise amplifier 13 is formed on the other side thereof.

The formation of the element 12 and amplifier 13 improves the layout of the apparatus.

[9] In the GPS wave antenna apparatus according to the above item [8], the one side of the printed board 11 on which the loop antenna element 12 is formed, is located in an innermost portion of a case 20.

Since the loop antenna element 12 is fixed in the case 20 stably in such a manner that they are close to each other, the reception characteristics are stabilized. If the other side of the printed board 11 on which the low noise amplifier 13 is formed is located in the innermost portion of the case 20, a gap is caused between the substrate 11 and case 20. Since basically the case 20 has a dielectric constant, the reception characteristics are varied with a value of the gap. The simple structure of the apparatus of the present invention prevents the reception characteristics from being varied.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A GPS wave antenna apparatus comprising:

a resinous case shaped like a shallow box having an opening of an entirety of one surface area perpendicular to a depth direction;

a substrate unit having a printed board which is detachably contained in an innermost portion of the resinous case through the opening, an antenna constituting element including a GPS wave antenna element having a thin-film conductive pattern being mounted integrally as one component on the printed board; and a conductive plate attached to the case so as to cover the opening and arranged opposite to the substrate unit at a fixed distance therebetween, the conductive plate being parallel at least to the GPS wave antenna element.

2. An apparatus according to claim 1, wherein the GPS wave antenna element is a loop antenna element having a thin-film conductive pattern formed on a printed board.

3. An apparatus according to claim 1, wherein the substrate unit includes a low noise amplifier provided on the printed board and a feeder connected to a feeder section of the GPS wave antenna element through the low noise amplifier.

4. An apparatus according to claim 3, wherein the GPS wave antenna element is formed on one side of the printed board and the low noise amplifier is formed on other side thereof.

5. An apparatus according to claim 4, wherein the one side of the printed board on which the antenna element is formed, is located in an innermost portion of the case.

* * * * *

UNITED STATES PATENT AND TRADEMARK OFFICE
CERTIFICATE OF CORRECTION

PATENT NO : 6,016,128
DATED : January 18, 2000
INVENTOR(S) : Imamura et al.

It is certified that error appears in the above-identified patent and that said Letters Patent is hereby corrected as shown below:

On sheet 2, delete Fig. 2 and insert therefor attached Fig. 2.

Signed and Sealed this

Tenth Day of October, 2000

Attest:

Q. TODD DICKINSON

*Attesting Officer*

*Director of Patents and Trademarks*